Feb. 18, 1930.  W. D. EDWARDS  1,747,291
CULTIVATOR ATTACHMENT
Filed Dec. 30, 1929  2 Sheets-Sheet 1
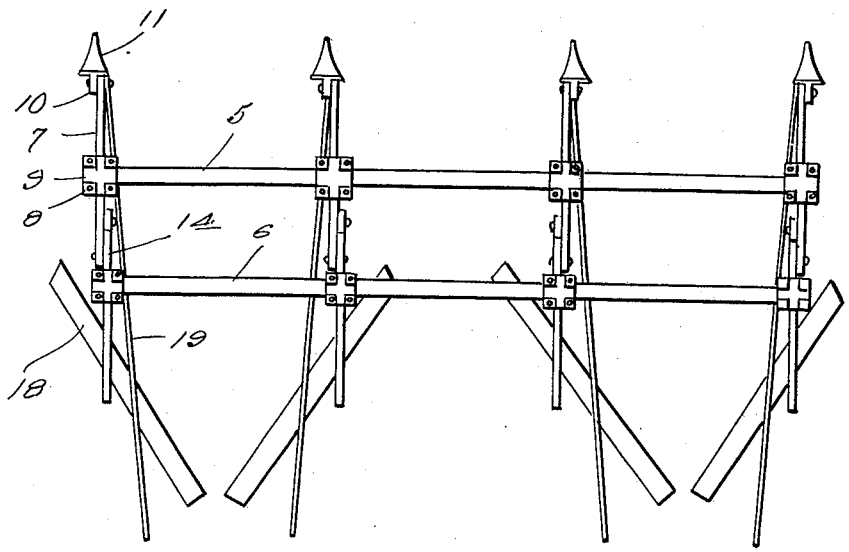
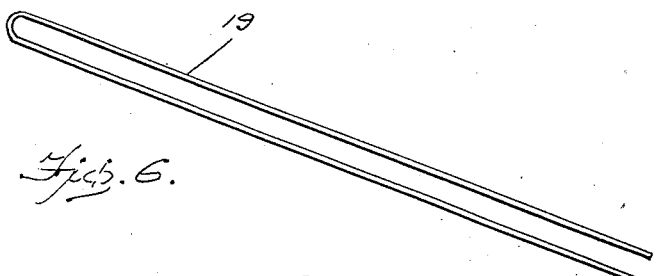
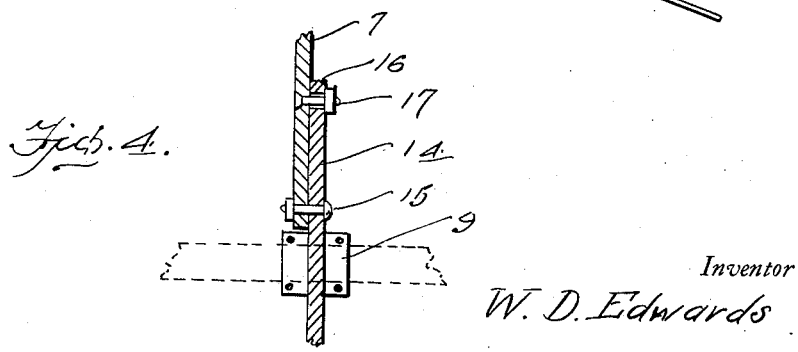
Inventor
W. D. Edwards
By Clarence A. O'Brien
Attorney

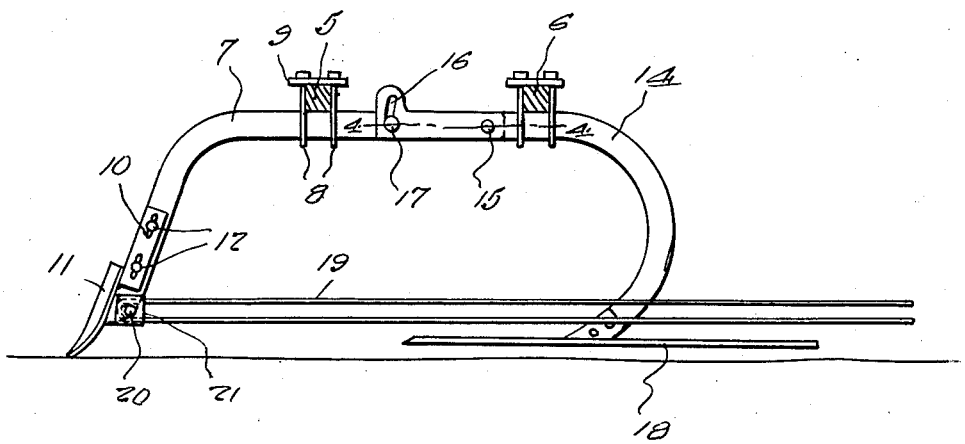
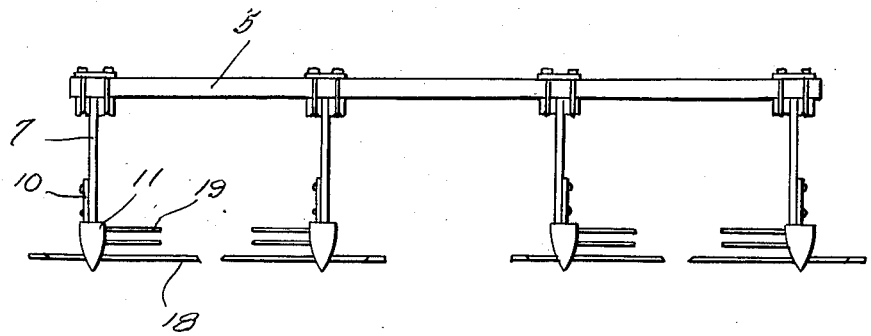
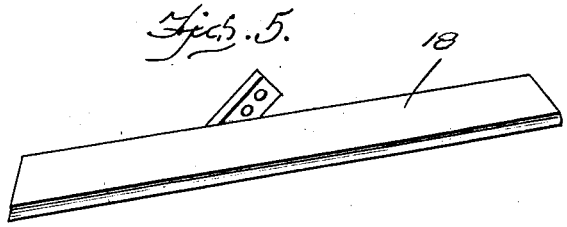

Patented Feb. 18, 1930

1,747,291

UNITED STATES PATENT OFFICE

WILLIAM D. EDWARDS, OF MANDERSON, WYOMING

CULTIVATOR ATTACHMENT

Refiled for abandoned application Serial No. 266,252, filed March 31, 1928. This application filed December 30, 1929. Serial No. 417,575.

This application is filed in the place and stead of my abandoned application Serial No. 266,252.

The present invention relates to an attachment for cultivators and has for its prime object to provide a structure which will lift bean or pea vines from the ground and lead them to a cutter.

Another very important object of the invention resides in the provision of a unit comprising a shovel and a knife disposed rearwardly of the shovel and means for leading vines lifted by the shovel to the cutter.

A still further very important object of the invention resides in the provision of a cultivator attachment of this nature which is simple in its construction, inexpensive to manufacture, strong and durable, thoroughly efficient and reliable in use, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:—

Figure 1 is a top plan view of a plurality of the attachments on the cross beams of a cultivator.

Figure 2 is a vertical section through the cross beam showing one of the attachments in side elevation.

Figure 3 is a front elevation of several of the attachments on the cross beams.

Figure 4 is a detail section, taken substantially on the line 4—4 of Figure 2.

Figure 5 is a perspective view of one of the cutters.

Figure 6 is a perspective view of one of the guides.

Referring to the drawings in detail, it will be seen that numerals 5 and 6 denote respectively the front and rear cross beams of a cultivator. A plurality of my attachments are fixed to the cross beams and as these attachments are identical in construction, only one unit will be described in detail.

Referring to one of the units in detail, it will be seen that the numeral 7 denotes a shank having a horizontal portion fixed under the front beam 5 by means of U-bolts 8 and plates 9, and extending forwardly and rearwardly of the beam 5. The forward end of the shank 7 is curved downwardly and a shank 10 of a shovel 11 is adjustably attached to the lower end thereof by pin and slot connections 12 so as to provide for adjustment. A shank 14 is attached to the beam 6 extending forwardly and rearwardly therefrom, and has an intermediate portion of its front part pivoted as at 15 to the rear end of the shank 7.

The end of the front bar of the shank portion is provided with an arcuate slot 16 concentric with respect to the pivot 15 and receiving a pin 17 projecting laterally from an intermediate portion of the rear part of the shank 7, thereby allowing adjustment between the shanks 7 and 14. The rear part of the shank 14 curves downwardly and forwardly and on the bottom end thereof there is disposed a knife 18, diagonally disposed with respect to the path of the unit, as is clearly indicated in Figure 1. A guide, in the form of a U-shaped elongated rod 19 has its bight disposed about a bolt 20 and secured thereto by means of a nut 21, or in any other desired manner, so as to extend rearwardly over the rearward portion of the knife 18.

From the above detailed description of the construction, it will be seen that the attachment may be used on most any two or four row cultivator, and operates with a relatively light draft. The shovels lift the vines out of the ground and the guide rod leads them to the knife, where they will be cut.

It is thought that the construction, utility and advantages of this invention will now be quite apparent to those skilled in this art, without a more detailed description thereof. The present embodiment of the invention has been disclosed in detail merely by way of example, since in actual practice it attains the features of advantage enumerated as desirable in the statement of the invention and the above description.

It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:—

1. A unit of the class described comprising a pair of shanks, means attaching the shanks together, means for attaching the shanks to beams, one shank extending forwardly and curved downwardly, a shovel fixed to the end of said one shank, the other shank being curved downwardly and rearwardly and then forwardly, a knife attached to the end of the other shank diagonally to the path of movement of the unit, a guide extending from the shovel rearwardly over the rear portion of the knife.

2. A unit of the class described comprising a pair of shanks, means adjustably connecting the rear end of one shank with the forward end of the other shank for attaching the shanks to cultivator beams, the forward end of said one shank being curved downwardly and forwardly, a shovel attached to the lower end of said one shank, said other shank being curved downwardly, rearwardly and then forwardly, a knife attached to the end of said other shank diagonally to the path of movement of the unit, and a U-shaped guide rod extending between the ends of the shanks.

3. A unit of the class described comprising a pair of shanks, means adjustably connecting the rear end of one shank with the forward end of the other shank for attaching the shanks to cultivator beams, the forward end of said one shank being curved downwardly and forwardly, a shovel attached to the lower end of said one shank, said other shank being curved downwardly, rearwardly and then forwardly, a knife attached to the end of said other shank diagonally to the path of movement of the unit, a U-shaped guide rod extending between the ends of the shanks, a bolt on the shovel, the bight of the guide rod extending about the bolt, and means on the bolt for holding the bight of the guide rod thereon.

In testimony whereof I affix my signature.

WILLIAM D. EDWARDS.